June 7, 1966 P. A. TERTYSHNIKOV 3,254,687
MACHINE FOR PREPARING OF FEED
Filed June 11, 1963 2 Sheets-Sheet 1

INVENTOR
P. A. TERTYSHNIKOV

BY
ATTORNEYS

United States Patent Office 3,254,687
Patented June 7, 1966

3,254,687
MACHINE FOR PREPARING OF FEED
Petr Alexandrovich Tertyshnikov, Moscow, U.S.S.R., assignor to Vsesouzny Nauchno-Issledovatelsky Institute Elektrifikatsii Selskogo Khozjaistva
Filed June 11, 1963, Ser. No. 287,130
6 Claims. (Cl. 146—79)

This invention relates to harvesting and more particularly to apparatus for processing livestock feed of varying consistency and composition.

It is well known that the machines nowadays utilized for this purpose are designed with a narrow scope of use, i.e., they are intended for processing strictly defined or single-variety raw materials and for preparing feed minced to a single uniform size and of invariable humidity.

Therefore, to prepare feed of varying consistency and degree of mincing, and from raw material of various grades and types, the necessity arises of providing for a wide variety of feed processing machines.

Although many attempts have been made to overcome the above mentioned difficulties by designing general-purpose machines intended for the preparation of feed of varying consistency and degree of mincing, however, as far as it is known none have proved to be efficient when turned out on an industrial scale.

At present it has been definitely established that the problem can be solved with the machine of the present invention, which is designed to process, from varying raw materials, livestock feed of differing consistency and degree of mincing.

An object of this invention, in a broad sense, is to improve the utilization of raw material (feed) resources, to create conditions for bettering the edibility and assimilation of the feed, for raising the efficiency of animal breeding, cutting down the production cost and raising the productivity of labor.

The machine under consideration has been designed for preparation of feed with the aid of a set of working elements for chopping and grinding that will also shred straw; a set of replaceable sieves (furnished with deflecting hoods, or smooth ones for direct flow sifting, or provided with a hulling surface, or slotted ones, etc.) for adjusting the degree of comminution; devices for humidification and for mixing together and discharging the feed mass, these elements to be used in various combinations, and all of the working elements being constructed in such as way as to be readily demounted, or partly, or wholly, rendered inoperative.

Figure 1:
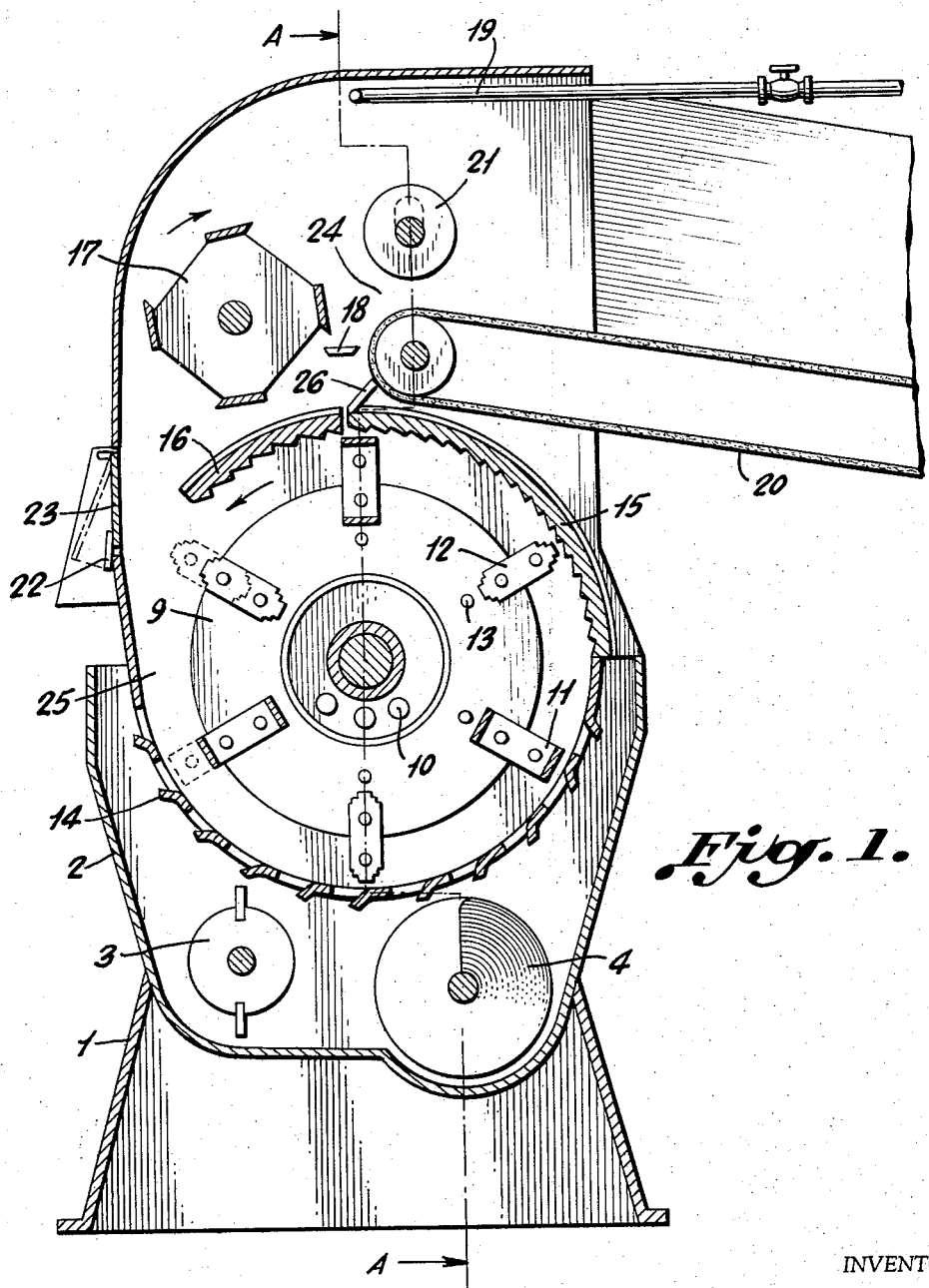
Figure 2:
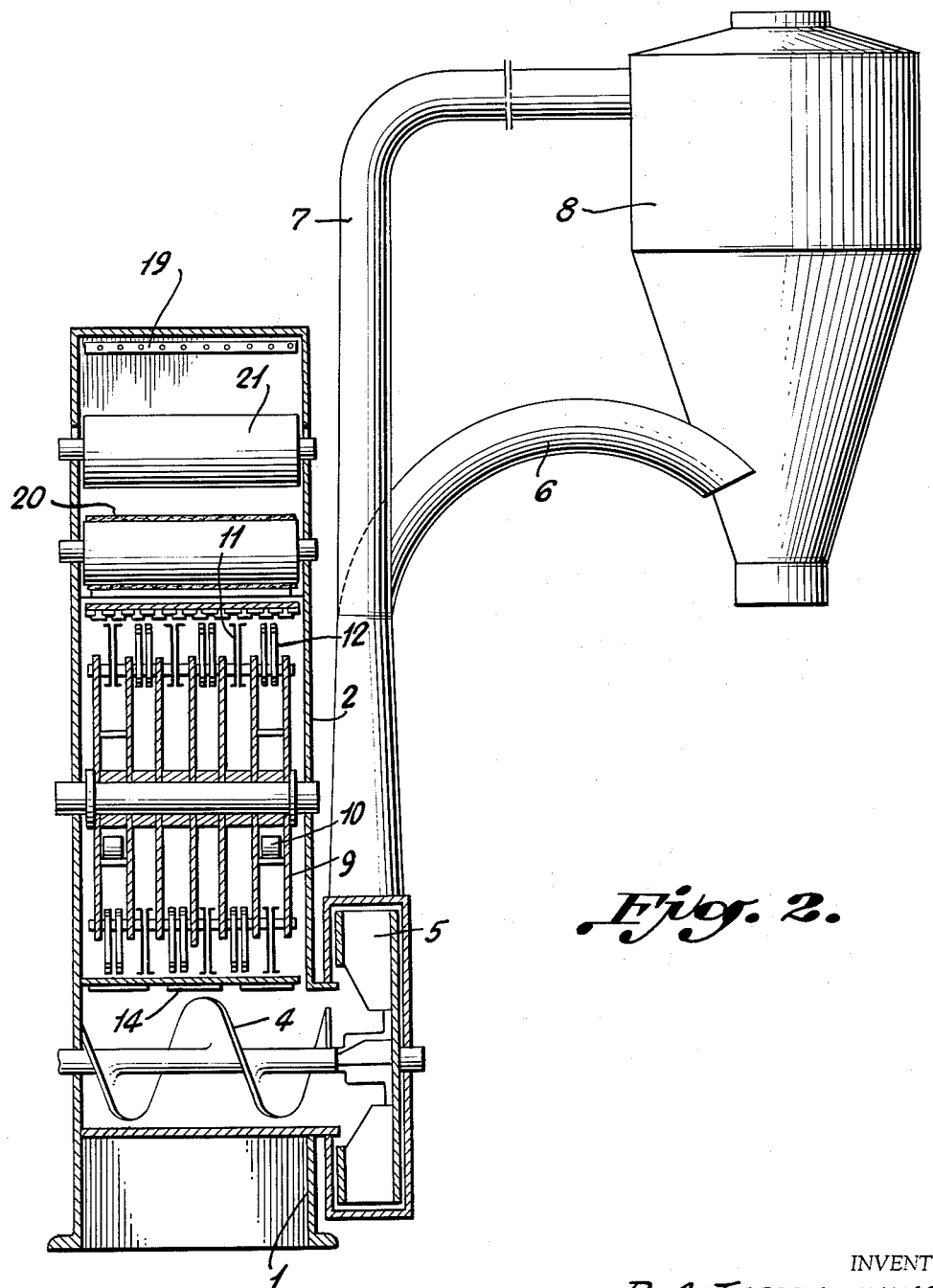

Further objects and advantages of the invention will become more readily apparent to those skilled in the art from the following detailed description and annexed drawings, and in which:

FIG. 1 is a longitudinal sectional view showing the apparatus of this invention, and, FIG. 2 a sectional view taken substantially on the line A—A of FIG. 1.

The machine of this invention (FIGS. 1 and 2) mounted on base 1 includes hollow body 2; tedder 3; conveying worm 4; feed discharge means comprising fan 5 (FIG. 2), pipe line 6 for the delivery of the wet feed mass and pipe line 7 for directing the dried and processed mass to cyclone 8; grinding (crushing) rotor 9 provided with a balancing device 10, with hinged knife means 11 and hammers 12 that may be locked by fingers 13 during adjustment of the machine; replaceable sieve 14 to control the degree of feed grinding; main serrated concave 15; an additional removable serrated concave 16; removable knife drum 17; removable fixed knife 18; perforated pipe 19 for humidifying the processed mass over the whole width of the machine; belt conveyor 20; and removable presser roll 21, mounted for movement in a vertical direction.

In the rear wall of body 2 there is a window or opening 22 that is normally closed by the hinge suspended freely movable protective shutter-door 23. Foreign matter, present in the raw material during processing, impinges on the door 23 to open the same and is discharged through window 22. Raw materials (silage, cake, grass, maize in the milk-wax stage of ripeness, fodder grain, root crops, haulm, etc.) and nutritional supplements (grain, oil-cake, hay meal, mineral additions, etc.) are charged into the mouth of receptacle 24 via belt conveyor 20 and with the aid of presser roll 21, to subsequently enter grinder 25.

For cleaning belt conveyor 20 a cleaning knife 26 is provided.

A description of the machine drive mechanisms is not provided since this is conventional and is not considered necessary to an understanding of the invention.

One or another combination of working elements and sieves may be used depending on the kind of the materials to be processed, their humidity, the required degree of mincing and their consistency; therefore, it is necessary to provide for easy access to replaceable and removable units and parts, necessary for quick readjustment of the machine.

For a better understanding of the invention by those who are skilled in the art, the invention will be further described with reference to the following specific examples that are purely illustrative.

For processing potatoes, root and melon crops and turning them into a pulp, as well as for processing grass in the young stage and turning it into paste, there are to be utilized hammers 12; knife means 11 are to be locked in non-working position by fingers 13; knife drum 17, fixed knife plate 18 and presser roll 21 are to be removed and sieve 14 with deflecting hoods, not shown, is to be installed.

The vegetable pulp is to be removed via pipe line 6.

For processing coarse silage, coarse plants and/or those with long stalks and turning them into vegetable pulp, there are to be utilized knife drum 17, fixed knife 18, presser roll 21, knife means 11 and, partly, hammers 12; sieve 14 is to be smooth for direct-flow sifting.

For processing especially coarse stalks there are to be used dentato-disc hammers and knife means of increased weight.

The processing of hay to convert it into hay-meal is to be carried out by utilizing knife drum 17, fixed knife 18, presser roll 21, knife means 11 and hammer 12; sieve 14 must have deflecting hoods or a hulling surface, not shown. The resulting mass is to be discharged into cyclone 8 via pipeline 7.

The processoing of dry grain and mineral supplements requires the operation of hammers 12, the locking of knife means 11 in operative position, the removal of knife drum 17, fixed knife 18 and presser roll 21, the insertion of additional serrated concave 16 and the installation of hulling sieve 14 for direct-flow sifting. The resulting mass is discharged to cyclone 8 via pipe line 7.

The processing of moist or sprouted grain and turning it into paste is to be performed by means of the same working units as for dry grain, but with the addition of water through perforated tube 19; in this case sieve 14 is to be smooth and for direct-flow sifting. The resulting mass is to be discharged via pipeline 6.

The shredding of straw and turning it into a chaffy mass with the addition of root and melon crops requires the removal of presser roll 21, fixed knife 18 and knife drum 17, the use of knife means 11 and, partly, of hammers 12; sieve 14 is to be used with slotted orifices for deflecting or zigzag sifting.

Acid, brine or alkali solution, and also molasses or artificial urea may be introduced via perforated pipe 19.

The nutritional feed to be added to the silage (grain, cake, hay meal, mineral supplements) is processed separately and admixed to the wet feed while the latter is being ground.

It is apparent to those who are skilled in the art that though the present invention is described in connection with the preferable form of embodiment, still changes and modifications are possible without departing from the concept and scope of the invention.

It is understood that the said changes and modification may take place only within the limits of the concept and scope of the invention and the appended claims.

What we claim is:

1. An apparatus for processing livestock feed, said apparatus comprising a base, a hollow body mounted on said base, a discharge conveyor mounted in the lower portion of said body, a rotor rotatably mounted in said body intermediate the height thereof, hammers adjustably mounted on said rotor, knife means adjustably mounted on said rotor, a selectively replaceable sieve disposed in said body below said rotor, a serrated concave fixed in said body and enclosing part of the upper portion of said rotor, said concave being disposed to cooperate with said hammers and knife means, and means for feeding raw material into the upper portion of said body.

2. An apparatus as defined in claim 1, in which means is provided to selectively lock said hammers or said knife means in inoperative position.

3. An apparatus as defined in claim 1 in which said body is provided with a window in a side wall in the path of movement of foreign material thrown from said rotor, and a freely swingable door normally closing said window, whereby foreign material impinging on said door will open the same to permit discharge of said foreign material.

4. An apparatus as claimed in claim 1 in which an additional selectively removable serrated concave is provided in said body as a continuation of said first concave.

5. An apparatus as defined in claim 1, in which a selectively removable rotary knife is provided in the upper portion of said body, a selectively removable fixed knife cooperating with said rotary knife, and a selectively removable presser roll cooperating with said feed means.

6. An apparatus as defined in claim 1, in which means is provided in the upper portion of said body for introducing a moistening agent.

References Cited by the Examiner

UNITED STATES PATENTS

| | | | |
|---|---|---|---|
| 91,343 | 6/1869 | Jackson | 241—191 |
| 2,042,946 | 6/1936 | Holland-Letz | 146—79 |
| 2,066,621 | 1/1937 | Gray | 146—79 X |
| 2,105,759 | 1/1938 | Stevenson | 241—82 X |
| 2,359,995 | 10/1944 | Korum | 146—79 |
| 2,477,628 | 8/1949 | Lanter | 241—192 |

LESTER M. SWINGLE, *Primary Examiner.*

J. SPENCER OVERHOLSER, *Examiner.*

WILLIE G. ABERCROMBIE, *Assistant Examiner.*